Patented Aug. 12, 1930

1,772,999

UNITED STATES PATENT OFFICE

FREDERICK W. HUBER, OF RIVERSIDE, CALIFORNIA

WATERPROOFING CEMENT AND COMPOSITION THEREFOR

No Drawing.   Application filed August 7, 1928.   Serial No. 298,132.

The present invention relates to an improvement in method and means for imparting to Portland and other hydraulic cements, and their neat grouts, mortars or concretes, waterproofness and high early strength and greatly increasing the ease of working of the grout, mortar or concrete.

It has long been known that oil can be made to intermingle with Portland cement mortars to impart to them waterproofness. It has also been proposed to grind with cement clinker petroleum, or other oil or its products either directly or absorbed on a filler like diatomaceous earth, bentonite, etc. I am also aware that it has been proposed to add to Portland cement and to grind into it, pulverulent mixtures of animal or mineral oil, hydrochloric acid or calcium chloride, with lime or calcareous material, and an inert absorbent mineral material or carrier. These proposals while giving fairly good results as far as waterproofness is concerned, suffer from the disadvantage that cements so treated are extremely difficult to mix with water and quite often such treated cements have their strength reduced.

Several inorganic salts are known whose aqueous solutions act as excitors or accelerators upon the hydration of Portland cement effecting an increase in the compressive strength during the early periods after the set, in the grouts, mortars or concretes made with cement so treated. Calcium chloride, calcium nitrate or the acids capable of forming these, ammonium chloride and sodium carbonate will generally act as accelerators of hydration. The effect of the aqueous solutions of these compounds upon cement does not assume practical proportions until a concentration is reached which shortens the setting time to such an extent as to restrict the usefulness to a very limited field such as the cementing of oil wells where a neat grout of cement is used containing a relatively large excess of water, (as described in my Patent No. 1,452,463 April 17, 1923).

The concentrations of such solutions must, as a rule, be equivalent to 2% or more of the salt based on the weight of cement treated.

Now then I have discovered that these objections can be overcome and the valuable properties of these salts and their advantages more fully realized if more or less concentrated solutions of these salts are dispersed in crude petroleum or its products in the form of an emulsion, in which the oil must be the external phase and this emulsion used either as an admixture to the dry cement or as an addition to the cement mortars or concretes after they have been gaged with water.

The oil of the emulsion acts as a protective film around each highly dispersed and colloidally dimensioned solution particle preventing its interaction with the cement until the emulsion is resolved into its components by an excess of water (as happens when the treated cement is mixed with water to form a paste mortar or concrete or when the emulsion is added to a water-mixed paste mortar or concrete). The free oil intermingling with the mortar or concrete imparting to it a very desirable fluidity or workability and imparting waterproofness to the set product. The free chemical solution reacts with the cement hastening those reactions which ultimately produce its strength. These emulsions have the additional valuable property that they develop the early strength of cement pastes, mortars and concretes with amounts of accelerators which when used alone in aqueous solution would exert a practically negligible influence upon the hardening process. For example treating a neat Portland cement putty with 2% (by weight based on the weight of dry cement) of an emulsion consisting of 50% California crude oil and 50% of a saturated solution of calcium chloride, a compressive strength was developed at the end of 3 days equal to that developed in a similar paste treated with an aqueous solution containing 2½% of the weight of the dry cement of calcium chloride. That is to say by the use of the emulsion a concentraton of 0.3% calcium chloride gave an ecceleration effect equal to that obtained by an aqueous solution (no oil) containing a concentration of 2½% calcium chloride. Cement so treated and made up into pumpable neat grouts can be used in cementing oil wells according to the standard methods.

In another example of making up the grout, mortar or wet concrete mixture (with or without sand, crushed stone or other fillers) a small proportion of the emulsion is added to the mortar during the mixing in of the necessary water, and the amount so added can vary between wide limits. In a particular example 2% of the emulsion was employed (based upon the weight of the dry Portland cement) this being added during the mixing of the cement and water (and sand in this particular example), and a mortar was produced of a surprising degree of plasticity. This mortar was then shaped into the desired form and allowed to stand and was observed from time to time. At the end of three days the product had very high strength, which ordinarily the mixture would not have had (without the emulsion added) before the end of three weeks. Obviously the emulsion should be mixed in before the set has commenced.

In the application of these emulsions to dry cement to produce a treated Portland cement ready for use I have found that it is better not to grind the emulsion into the cement by adding the emulsion to the clinker but to simply mix it at any time after the grinding operation is completed. Contrary to what might be expected from a prior reasoning it is not necessary that the emulsion be present as a film around each cement grain. It has been demonstrated that before the water can soften the cement grain it will have to displace the oil film enveloping it. Inasmuch as the waterproofness arises from a re-mingling of the oil with cement or cement and aggregate during preparation of these materials, no useful purpose will be served by aiming at any great uniformity of distribution, during premixing the emulsion with the dry cement.

It is better that only a portion of the cement grains (in the dry state) be coated with the emulsion otherwise the cement will not readily mix or amalgamate with the water. That is to say; as long as a given weight contains the proper amount of emulsion adequate and sufficient distribution of the oil will result when the dry cement is mixed with water (or with aggregate and water) to impart waterproofness to the set or hardened product.

The preparation of the emulsion constitutes one of the novel features of the invention, and may be conveniently carried out as follows:—As emulsifying agent I prefer to use the residue resulting from the cracking of crude petroleum by the "Dubbs" process this material is a rather viscous tar-like complex known as "Dubbs sludge". To the crude petroleum to be used in making the emulsion I add about 1% of this Dubbs sludge and thoroughly mix. While this mixture is being maintained in vigorous agitation, I add to it a more or less concentrated (preferably nearly saturated) aqueous solution of any of the inorganic salts above described which can act as excitors or accelerators in predetermined amount and continue the agitation until a seemingly uniform liquid results. In the emulsion so produced oil is the external phase and the aqueous excitor solution the internal. Very stable emulsions result which are not much more viscous than the crude oil used in forming them, in which as much as 4 parts saturated excitor solution can be made to disperse in one part of oil, yet the oil constitutes the external or continuous phase.

For the excitor or accelerators I do not want to be limited to any of the following; calcium chloride, hydrochloric acid, calcium nitrate, nitric acid, ammonium chloride and sodium or potassium carbonate but wish to claim solutions of any or all of them as the aqueous component of the emulsion.

While an emulsion consisting of 1 part oil and 1 part excitor solution (e. g. concentrated $CaCl_2$ solution) gives the optimum effects, for general use emulsions with a greater amount of excitor solution will be useful in those fields where waterproofness is of less moment than early strength. For example in the treatment of cement to be used in cementing oil wells a higher content of excitor solution would be advantageous.

An emulsion as prepared above possesses also the advantage that it is highly stable, and is highly dispersed. Such emulsion can be kept in storage for a considerable time or can be shipped around, and requires no particular treatment, other than perhaps stirring up to make the mixture uniform, before application to the cement mortar or cement and water being mixed to produce the mortar, or to the dry cement.

Another important advantage of the use of this emulsion, for use in cement work is the fact that while the hardening is greatly accelerated, the initial set of the cement is not accelerated to any substantial extent, when used in the amounts above indicated. Hence the ordinary methods of working the mixed cements do not have to be altered.

While Dubbs sludge is an ideal emulsifier for the purpose other emulsifiers could be used such as gasoline solution of asphalt added to the crude oil to be emulsified. For this purpose about 3% of a 10% asphalt in gasoline solution will serve. Colloidal clay such as fuller's earth or bentonite added to and mixed with the crude oil or lamp black will also serve as emulsifiers when used in amount up to 5% of the weight of crude oil.

I claim:—

1. A process of treating hydraulic cement for waterproofing and for accelerating the development of strength in the set cement, which comprises incorporating with the cement, water in amount sufficient to produce a plastic mass and an emulsion of an aqueous liquid which will leave a soluble alkaline earth metal salt capable of accelerating the hardening of the cement, in an essentially hydrocarbon oil, the latter constituting the external phase.

2. A process of treating hydraulic cement for waterproofing and for accelerating the development of strength in the set cement, which comprises incorporating with the cement, water in amount sufficient to produce a plastic mass, and an emulsion of an aqueous liquid which will leave calcium chloride, in an essentially hydrocarbon oil, the latter constituting the external phase.

3. A process of treating hydraulic cement for waterproofing and for accelerating the development of strength in the set cement, which comprises incorporating with freshly formed cement mortar, an emulsion of an aqueous liquid which will leave a substance capable of accelerating cement hardening, in an essentially hydrocarbon oil, the latter constituting the external phase.

4. A process of treating hydraulic cement for waterproofing and for accelerating the development of strength in the set cement, which comprises incorporating with the cement, water in amount sufficient to produce a plastic mass, and an emulsion of an aqueous liquid which will leave a soluble alkaline earth metal salt capable of acting as an accelerator in the hardening of the cement, in a viscous petroleum oil containing asphaltic constituents, said oil constituting the external phase.

5. A novel treating agent for hydraulic cement which comprises a viscous petroleum oil material as the external phase, in which is emulsified a solution of calcium chloride as the disperse phase, the latter constituting an accelerator for the hardening of the cement, the said materials being in such proportions that when incorporated into a cement grout the same will act to accelerate the hardening of the cement and to waterproof the same.

6. A process which comprises mixing a small proportion of an emulsion of a solution of an accelerator selected from the group consisting of an alkaline earth metal salt capable of acting as an accelerator in the hardening of the cement and an acid capable of forming such a salt, said solution forming the disperse phase in a hydrocarbon oil material constituting the external phase, with a much larger proportion of hydraulic cement and thereafter adding water thereto in amount sufficient to produce a plastic mass.

7. A process which comprises mixing a small percentage of an emulsion with a dry hydraulic cement, and adding water thereto in sufficient proportion to form a plastic mass, said emulsion containing a hydrocarbon oil as the external phase and an aqueous solution of an accelerator selected from the group consisting of an alkaline earth metal salt capable of acting as an accelerator in the hardening of the cement and an acid capable of producing such a salt.

8. A process which comprises adding an emulsion to the materials of a hydraulic cement mortar, said emulsion having petroleum oil material as its external phase and a concentrated aqueous solution of a substance adapted to leave a soluble alkaline earth metal salt capable of acting as an accelerator in the hardening of the cement, as the internal phase.

9. A process which comprises adding an emulsion to the materials of a hydraulic cement mortar, said emulsion having petroleum oil material as its external phase and a concentrated aqueous solution of a substance adapted to leave a soluble alkaline earth metal salt capable of acting as an accelerator in the hardening of the cement, as the internal phase, the ratio of electrolyte to oil, in said emulsion being between about 1:1 and 4:1.

10. A cement treating agent comprising an emulsion having a viscous mineral oil material as its external phase and a concentrated aqueous solution of a substance selected from the group consisting of calcium chlorid and hydrochloric acid as its internal phase, said materials being in such proportions that when incorporated in a Portland cement grout, the same will act to accelerate the hardening of the cement and to waterproof the same.

11. A cement treating agent comprising an emulsion having a viscous mineral oil material as its external phase and a concentrated aqueous solution of a substance selected from the group consisting of calcium chlorid and hydrochloric acid as its internal phase, said materials being in such proportions that when incorporated in a Portland cement grout, the same will act to accelerate the hardening of the cement and to waterproof the same, the ratio of electrolyte to oil in said emulsion being between about 1:1 and 4:1.

12. The herein described process of simultaneously imparting the property of high early strength and watertightness (or waterproofness) to hydraulic cements their grouts, mortars or concretes, by treating them with an oil emulsion in which the dispersed phase is a concentrated solution of a substance capable of accelerating the hydration and hardening of the cement.

13. A new process which comprises adding to a hydraulic cement material, a small proportion of an emulsion which contains oil as the external phase and which carries as its internal phase an aqueous material capable of leaving an accelerator in the mass, and thoroughly mixing in the presence of sufficient water to hydrate the hydraulic cement.

14. A process of treating hydraulic cement for waterproofing and for accelerating the development of strength in the set cement, which comprises incorporating with the cement, water in amount sufficient to produce a plastic mass, and an emulsion of an aqueous liquid containing in solution at least one substance selected from the group consisting of calcium chloride, hydrochloric acid, calcium nitrate, nitric acid, ammonium chloride, sodium carbonate and potassium carbonate, in a viscous petroleum oil containing asphaltic constituents, said oil constituting the external phase.

15. The herein described process which comprises first mixing an emulsion containing oil as the external phase and containing droplets of an accelerating solution selected from the group consisting of a strong solution of a calcium salt acting to accelerate the hardening of hydraulic cement, and an acid which will produce such a calcium salt, with hydraulic cement and at any stage of the whole process, mixing with water in at least a sufficient amount to hydrate the hydraulic cement.

In testimony whereof I affix my signature.

FREDERICK W. HUBER.